United States Patent [19]

Peterson

[11] 4,197,889

[45] Apr. 15, 1980

[54] SECURITY SCREW, DRIVER THEREFOR, AND PROCESS

[75] Inventor: Francis C. Peterson, St. Louis County, Mo.

[73] Assignee: C. Hager & Sons Hinge Manufacturing Company, St. Louis, Mo.

[21] Appl. No.: 953,013

[22] Filed: Oct. 20, 1978

[51] Int. Cl.² .......................................... B25B 15/00
[52] U.S. Cl. .............................. 145/50 A; 145/50 D; 145/50 E
[58] Field of Search ............... 145/50 A, 50 D, 50 E; 85/45

[56] References Cited

U.S. PATENT DOCUMENTS

| | | | |
|---|---|---|---|
| 52,631 | 2/1866 | Weaver | 145/50 A |
| 1,777,936 | 10/1930 | Roberts | 145/50 A |
| 1,826,988 | 10/1931 | Campbell | 85/45 |
| 2,301,590 | 11/1942 | Signorelli | 145/50 E |
| 2,445,383 | 7/1948 | Barlow | 145/50 E |
| 2,764,886 | 10/1956 | Wiesmann | 85/45 |
| 2,931,265 | 4/1960 | De Lacy | 85/45 |
| 3,044,584 | 7/1962 | Thompson | 85/45 |
| 3,419,135 | 12/1968 | Millner | 145/50 A |
| 3,499,358 | 3/1970 | Frye et al. | 85/45 |
| 3,674,070 | 7/1972 | Mahoney | 145/50 A |

FOREIGN PATENT DOCUMENTS

| | | | |
|---|---|---|---|
| 23421 | of 1910 | United Kingdom | 85/45 |
| 511033 | 8/1939 | United Kingdom | 145/50 A |

*Primary Examiner*—Othell M. Simpson
*Assistant Examiner*—J. T. Zatarga
*Attorney, Agent, or Firm*—Gravely, Lieder & Woodruff

[57] ABSTRACT

A security screw has an axially directed drive hole in its head, with the axis of that hole being coincident with the axis of the screw itself. To turn the screw in either direction, the shank of a driver is inserted into the drive hole and turned in the desired direction. The shank has at least one camming surface on it in the form of a land, and a gripping rod extends along that camming surface in the direction of the shank, the rod being generally centered with respect to the camming surface over which it lies. The arrangement is such that when the shank of the driver is turned with the gripping rod remaining generally with the screw head, the shank forces the gripping rod outwardly into snug contact with the side wall of the drive hole. Indeed, the gripping rod becomes lodged tightly between the wall of the drive hole and the shank of the driver so that the torque applied to the driver is transferred to the screw. Once the screw is tightened, a cylindrical plug may be forced into the drive hole to enhance the security afforded by the screw.

21 Claims, 8 Drawing Figures

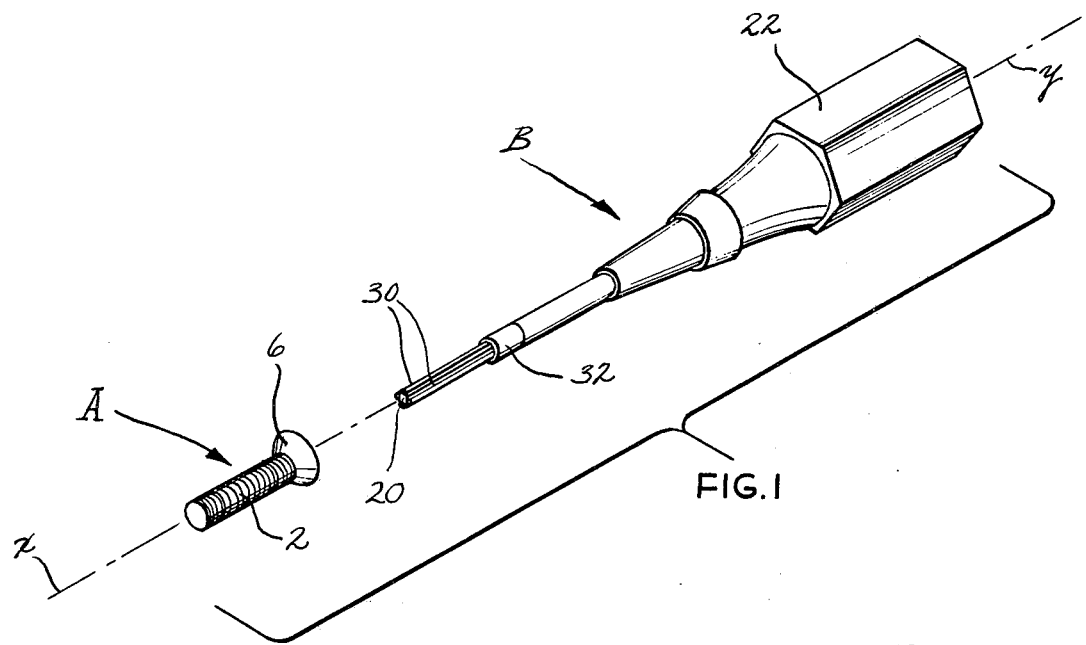
FIG. 1
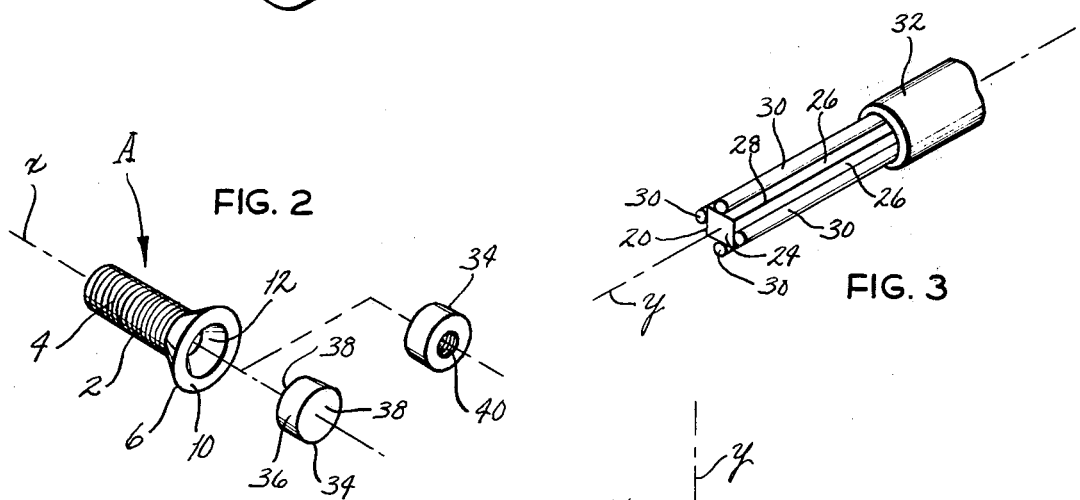
FIG. 2
FIG. 3
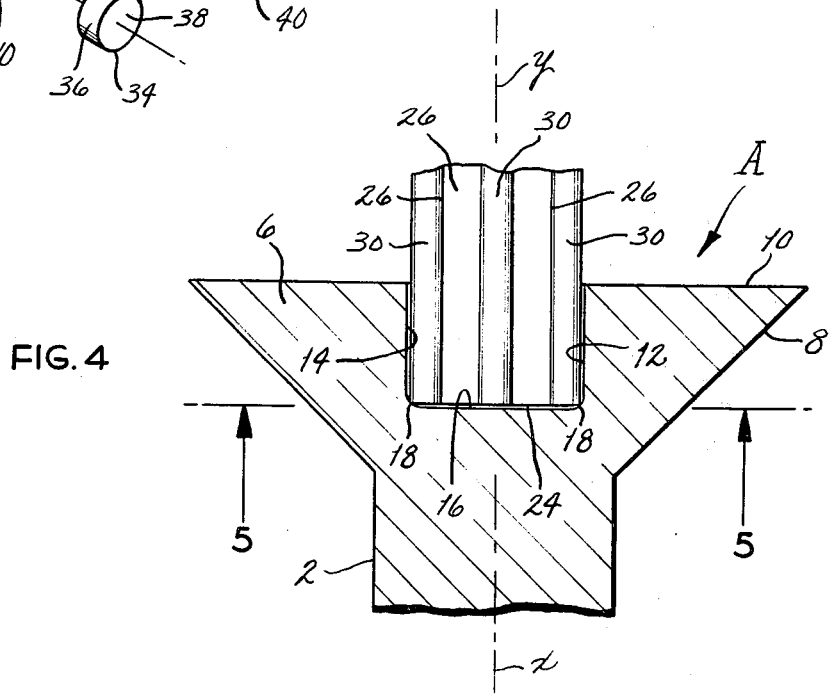
FIG. 4

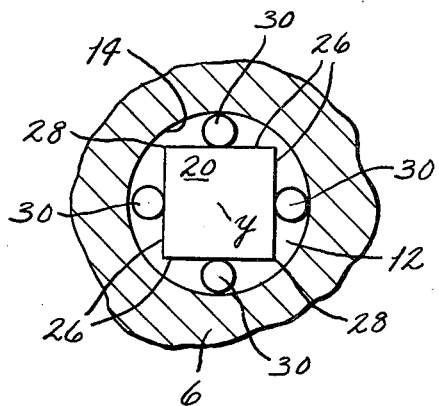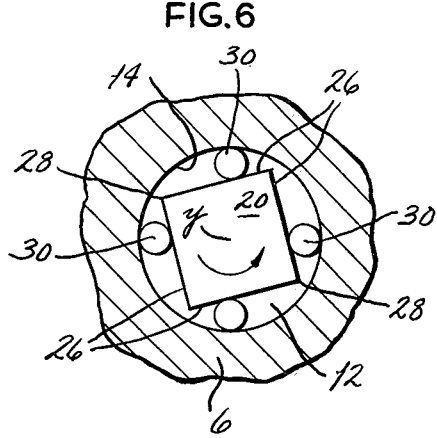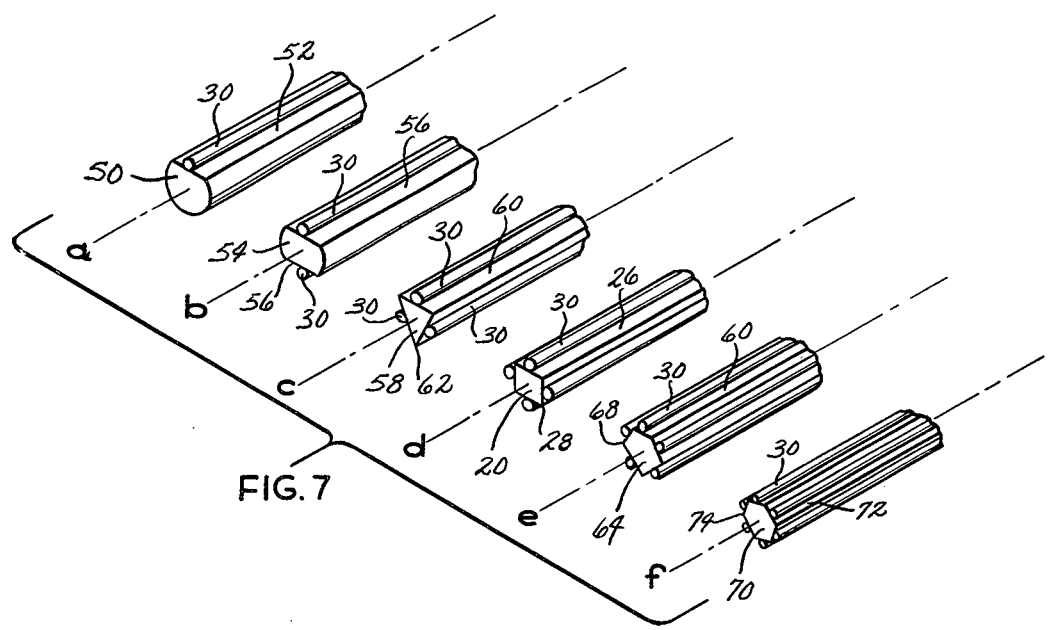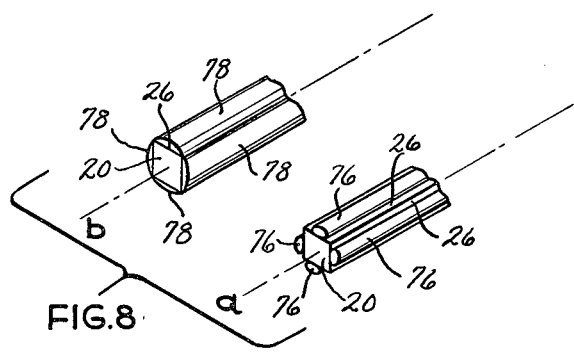

SECURITY SCREW, DRIVER THEREFOR, AND PROCESS

BACKGROUND OF THE INVENTION

This invention relates in general to fastening devices, and more particularly to a security screw, a driver therefor, and to a process for turning a screw.

The great majority of wood screws, sheet metal screws, and machine screws currently produced have heads provided with single cross slot or else two slots that intersect at right angles in the center of the head, the latter being known as a Phillips head. Screw drivers are readily available for engaging and turning these screws. Even when suitable screw drivers are not available, implements can usually be found or improvised to engage the heads of these screws and turn them. For example, a knife blade or a coin will often fit the single cross slot in a screw head, and if the knife blade has a point, it will most likely fit a Phillips head screw.

Since screws having conventional heads are easily removed, they are not suitable for some applications, particularly where security is involved. For example, in prisons and other detention facilities screws are used to secure a wide variety of objects including the locks and hinges of the cell doors, as well as less critical objects such as mirrors on walls, bunks and plumbing fixtures. Idleness coupled with a desire to escape provides a great incentive to loosen these screws. Also, certain areas of buildings, transport conveyances, and the like, to which the general public is admitted in large numbers, are occasionally dismantled. For example, some people harbor a desire to remove the screws holding the partitions in washroom facilities in place, or to remove the screws that secure the back rests and seats of transit vehicles.

Security screws of various head configurations are presently marketed for those special applications which cannot be served by screws having conventional heads. Perhaps the simplest is the so-called one-way screw, which closely resembles a head having a single cross slot, except that the head is beveled away at two locations adjacent to the slot such that the screw can be turned clockwise with a conventional bladed screw driver, but cannot be turned counterclockwise to extract it. This type of screw is not very secure since with enough persistence one can usually work it out with a conventional screw driver. Even so when an authorized removal is necessary, the head presents enough difficulty to make that removal a burdensome and time-consuming operation. Another type of security screw has, in effect, two heads. The outermost is easily engaged with a screw driver, and is therefore used to drive the screw. The other bears against the surface to be secured, but is not easily engaged with a screw driver or other conventional tool. Once the screw is in place, the outer head is merely broken off, leaving the inner head to hold whatever is secured by the screw. The break, however, leaves the inner head with a jagged edge that is not only unsightly, but dangerous as well. Still another security screw, known as a spanner head screw, has two axially directed holes which open out of its head, both being offset from the screw axis. These screws are installed with a special driver having two axially directed nibs which fit into the holes and enable the driver to turn the head. The special drivers are not readily available to the general public, but even so, with a little filing, implements can be fashioned out of knives and the like for engaging the holes in the typical spanner head. Also, the nibs on the authorized drivers for these screws break off quite easily, so one that works with such screws must have an ample supply of the authorized drivers.

In addition to the foregoing deficiencies, all of the security screws of current manufacture are quite expensive, because none are produced in a simple cold-heading operation. Indeed, most require expensive machining operations.

Aside the lack of security offered by conventional slotted and Phillips head screws, these heads do not present clean unobstructed surfaces, which are often required in devices fabricated for the food service and medical service industries.

SUMMARY OF THE INVENTION

One of the principal objects of the present invention is to provide a screw having a head which is incapable of being engaged by any conventional tool, nor is it possible to easily fashion a tool for engaging the head. Another object is to provide a screw of the type stated which is inexpensive to manufacture and can be manufactured by a simple cold-heading process. A further object is to provide a screw of the type stated which may be removed if the proper driver is available, all to permit disassembly and servicing of the secured device. An additional object is to provide a screw of the type stated which if desired may be provided with a smooth unobstructed surface. Still another object is to provide a driver for the screw of the type stated. Yet another object is to provide a method of driving or extracting screws. These and other objects and advantages will become apparent hereinafter.

The present invention is embodied in a screw driver having a shank provided with a camming surface and a gripping element positioned along the camming surface, the arrangement being such that as the camming surface moves under the gripping element, it forces the gripping element outwardly so that it frictionally engages the surface of a drive hole in the screw. The invention is also embodied in a security screw having a drive hole opening out of it at one end, with the axis of the drive hole being coincident to the axis of the screw itself. The invention also resides in the combination of the driver and the screw and in the process for turning the screw with the driver. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur FIG. 1 is a perspective view of a security screw and driver therefor, each constructed in accordance with the present invention;

FIG. 2 is a front perspective view of the security screw showing plugs suitable for closing the drive hole in the screw;

FIG. 3 is an enlarged fragmentary perspective view of the shank end of the driver;

FIG. 4 is a sectional view of the security screw, showing the driver within the drive hole of the screw, but before the driver is turned;

FIG. 5 is a sectional view taken along line 5—5 of FIG. 4;

FIG. 6 is a sectional view similar to FIG. 5, but showing the shank of the driver turned and the gripping rods forced outwardly into engagement with the wall of the drive hole in the screw;

FIG. 7 is a collection of fragmentary perspective views showing different shank configurations for the driver; and FIG. 8 is a pair of fragmentary perspective views showing different gripping rod configurations for the driver.

DETAILED DESCRIPTION

Referring now to the drawings (FIG. 1), A designates a security screw that is installed or extracted with a driver B, the latter being adapted to engage the screw A at its head and to turn the screw A either clockwise or counterclockwise. The screw A may have any of the conventional thread configurations. For example, it may be a machine screw, a wood screw, a sheet metal screw, or a thread-forming screw. It may also have any of the several heads that are currently made, such as, a flat head, a beveled head, a round head, or a pan head. Indeed, the screw A may even be headless as are set screws. For convenience only the flat head-machine screw embodiment of the screw A will be described and illustrated in detail.

The screw A includes (FIGS. 2 & 4) a shank 2 of generally cylindrical configuration, and the shank 2 has a thread 4 on its exterior surface. One end of the shank 2 is completely free and the thread 4 extends all the way out to this end. At its other end the shank 2 merges into a head 6 having a beveled side surface 8 and a flat end surface 10. In addition, the head 6 has a drive hole 12 that opens out of the end surface 10, this hole being perfectly cylindrical and coaxial with the shank 2. In other words, the drive hole 12 and cylindrical shank 2 share a common axis X which extends through the screw A. Being cylindrical, the hole 12 has a cylindrical side wall 14 and also an end wall 16 located deep within the head 6. The end wall 16 need not be squared off with respect to the axis X of the screw A, and its exact configuration will depend to a large measure on the process by which it is formed. Preferably, the cylindrical side wall 14 and end wall 16 do not merge at a sharp corner, but instead at a small radius or fillet 18 (FIG. 4).

The screw A is relatively easy and inexpensive to manufacture from conventional wire stock. First the wire stock is cut to the desired length and then subjected to a cold-heading operation by which the head 6, including its drive hole 12, are formed. This will most likely require two hits in the heading operation. Thereafter the threads are rolled onto the shank 2. The head 6 may also be formed without the hole 12, and the hole provided afterwards in a simple drilling operation.

The driver B is adapted to fit loosely into the drive hole 12 in the screw head 6, and once in place to frictionally engage the cylindrical side wall 14 such that the screw A may be rotated in either direction about its axis X. To this end, the driver B is provided with (FIGS. 3–5) a shank 20 which is square in cross section, yet small enough to fit quite loosely into the drive hole 12 of the screw head 6. Conventional square key stock is ideally suited for the shank 20. At its rear end the shank 20 extends into a handle 22 which is configured to be easily gripped and turned. It may resemble a conventional screw driver handle. The shank 20 and handle 22 are secured firmly together so that when the handle 22 rotates, the shank 22 also rotates.

The shank 20 extends forwardly from the handle 22 and terminates at a forward end face 24 that is perpendicular to the axis Y of the shank 20. Being square in cross section, the shank 20 has four flat side surfaces 26 which intersect each other at right angle corners 28. These surfaces 26 are closest to the axis Y of the shank 20 at their midportions and farthest from the axis Y along their corners 28. In other words, the side surfaces are eccentric with respect to the axis Y. The maximum width of the shank 20, that is the length of a diagonal from one corner 28 to the opposite corner 28, is less than the diameter of the drive hole 12 in the screw head 6, thus allowing the shank 20 to fit into the drive hole 12. Indeed, the shank 24 never comes in contact with the cylindrical side wall 14 of the hole 10 because along its side surfaces 26 it is provided with gripping rods 30. The rods 30 in effect position the shank 20 inwardly from the cylindrical side wall 14 and center it in the hole 12 so that the axis Y of the shank 22 is coincident with the axis X of the screw A.

Each gripping rod 30 is extended axially along the side surfaces 26 over which it lies generally midway between the corners 28 that bound the surface 26. Moreover, the diameter of the rods 30 is such that a loose or slip fit exists between the outwardly presented areas on the rods 30 and the cylindrical wall 14 of the hole 12 (FIGS. 4 & 5). The distance between the outwardly presented areas on two opposite gripping rods 30 should exceed the diagonal of the shank 20, or in other words, the rods 30 should project farther beyond the axis Y of the shank 20 than the corners 28 so that a circle that circumscribes the four rods 30 and is tangent to their outwardly presented areas will be located outwardly from the corners 28.

The gripping rods 30 have their forward ends flush with the flat end face 24 of the shank 20, but the rods 30 are not secured to the shank 20 at their forward ends. On the contrary, the gripping rods 30 are attached to the shank 20 only at their rear ends where a collar 32 (FIG. 3) extends around the shank 20 and embraces the rods 30, holding those rods 30 tightly against shank 20 in a centered disposition with respect to their respective side surfaces 26. The rear ends of the gripping rods 30 may also be attached to the surfaces 26 by brazing. Whatever the means for attachment, the attachment should be such that the rods 30, unless otherwise displaced lie directly against their respective side surfaces 26 and are further centered with respect to those side surfaces 26. Nevertheless at its forward end each rod 30 can be displaced in either direction along its side surface 26, that is toward either of the right angle corners 28 that delineate the side surface 26. This displacement may be accommodated at the attachment of the rod 30 to the shank 22 or in the resiliency or the rod 30 itself or both. Moreover, the distance the rods 30 project beyond their points of attachment to the shank 20 should exceed the depth of the drive hole 12. Whenever a rod 30 is displaced laterally on its side surface 26, it in effect increases the spacing between it and the center axis Y of the shank 20, and this characteristic enables the drive rods 30 to bear against and frictionally grip the cylindrical side wall 14 of drive hole 12 with sufficient force to enable the driver B to turn the screw A.

To drive or extract the screw A with the driver B, the forward end of the shank 20 on the driver B is inserted into the drive hole 12 in the head 6 of the screw A, and the gripping rods 30, being on the forward end of the shank 20, likewise enter the drive hole 12. Then the driver B is urged forward with a moderate force to bring the forward ends of the rods 30 against the fillet 18 at the bottom of the hole 12 (FIG. 4). At the same time the driver B is turned in the desired direction at its handle 22. Inasmuch as the forward ends of the rods 30 are against the fillets 18, they tend to remain in that position with respect to the head 6, and as a consequence the shank 20 moves underneath the rods 30 so that the forward ends of the rods 30 are no longer centered on their respective side surfaces 26 for the shank 20 (FIG. 6). In effect, the surfaces 26 of the shank 20 cam the gripping rods 30 outwardly until the rods 30 come into contact with and bear snugly against the cylindrical wall 14 of drive hole 12. Thus, the side surfaces 26 function as cams or camming surfaces. As the torque applied to the shank 20 increases, the shank 20 urges the rods 30 still further outwardly thereby maintaining and even enhancing the bite on the cylindrical wall 24. The rods 30 in effect become lodged or wedged tightly between the surfaces 26 of the shank 20 and the cylindrical wall 14 of hole 12. Consequently, the driver B grips the screw A along the cylindrical wall 14 within the head 6 and maintains the grip for as long as torque is applied to the driver B, with the magnitude of the bite or grip being dependent to a large measure on the magnitude of the torque.

In lieu of starting by engaging the forward ends of the gripping rods 30 with the fillet 18 in the hole 12, the driver B may be cocked slightly so that its axis Y is at a slight angle to the axis X of the screw A. This causes the outwardly presented areas of the rod 30 to bear against the wall 14 with force sufficient to enable them to remain in place as the shank 20 of the driver B turns beneath them.

Once the screw A is run down to its full extent, the driver A is withdrawn, leaving the head 6 with the exposed drive hole 12. In this condition, the screw A is quite secure since it is extremely difficult to turn without the driver B. However, even greater security may be acquired by inserting a filler plug 34 (FIG. 2) into the drive hole 12. The plug 34 has a cylindrical side surface 36 and flat end surfaces 38, the latter being perpendicular to the former. The diameter of the plug 34 is slightly greater than the diameter of the drive hole 12 so that an interference fit will exist between the side surface 36 of the plug 34 and the side wall 14 of the hole 12. Moreover, the height of the plug 34 is slightly less than the depth of the hole 12 so that the plug 34 can be driven inwardly until its exposed end face 38 is flush with the flat end wall 16 of the head. Of course, where the plug 34 is used in a screw having a different type of head, the exposed end face 38 of the plug 34 should conform to the contour of the adjoining surface and exposed end face 38 are flush. The interference fit causes the head 6 to expand slightly and thereby tighten the screw A still further.

The plug 34, once it is installed, cannot be easily gripped and extracted, due to its friction fit and flush disposition. As a consequence, the screw A once it has been fitted with the plug 34, is practically impossible to grip with any conventional tool and improvised tools as well. This feature makes the screw ideally suited for applications which require a high degree of security such as in connection with jail cells. The lack of any surface indentations on the exposed portion of the screw A further makes it quite useful in applications where cleanliness is a major consideration such as in the case of equipment used for food and medical services.

Should it become necessary to remove the screw A, a hole is drilled axially into and completely through the plug 34 and thereafter tapped to provide it with a conventional thread. Then a small machine screw is threaded into the hole. The small machine screw is turned down until it bottoms out against the end wall 16 of the hole 12. Thereafter the small machine screw functions as a jack screw in that continued rotation lifts the plug 34 out of the drive hole 12. Similarly, the small machine screw may be gripped by a pliers or similar device for exerting a withdrawal force on it.

To simplify the plug extraction process, the plug 34 may be provided with a drilled and tapped hole 40 (FIG. 2), but to prevent unauthorized removal of the plug 34, the thread of the hole 40 should not match readily available machine screws. On the contrary, it should be an unusual thread or even perhaps a left hand thread.

The shank of the driver B may assume other shapes (FIG. 7), and the number of gripping rods 30 will vary accordingly. Indeed, the shape may vary from a single camming surface to a multitude of camming surfaces, with the gripping rods 30 for any particular shape corresponding in number to the camming surfaces of that shape. Beginning with the simplest configuration, a shank 50 (FIG. 7a) is for the most part cylindrical in configuration, having a diameter slightly less than that of the drive hole 12 of the screw head 6 so that the shank 50 will fit easily into the drive hole 12. The shank 50 has a single camming surface or land 52 of uniform width, and positioned over the land 52 is a gripping rod 30. The forward end of the single rod 30 is detached from the shank 50 and is therefore free to shift laterally on the land 52, from one side of the land 52 to the other. However, the rod 30 normally assumes a centered disposition on the land 52, and when in this position, the outwardly presented area of the rod is located at a radius only slightly greater than the cylindrical surface of the shank 52. Of course, when the rod 30 shifts laterally with respect to the land 52, the radius at which its outwardly presented surface is located increases, and this enables the rod 30 to grip the cylindrical wall 14 of the drive hole 12. Thus, to turn the screw A, the shank 50 is merely inserted into the drive hole 12 and turned in such a way that single gripping rod 30 remains, at least at its forward end, with the screw head 6, while the shank 50 rotates relative to the screw head 6. This causes the land to move under the rod 30 and drive the rod 30 outwardly away from the center axis Y of the shank 50. The rod 30 and shank 50 become lodged in the drive hole 12, with both gripping the cylindrical wall 14 of the hole 12.

Another modified shank 54 (FIG. 7b) likewise has a cylindrical configuration, but instead of a single land, it has two lands 56 located at 180° with respect to each other. Along each land 56 are gripping rods 30, and the diameter of the entire arrangement measured across the outside surfaces of the two gripping rods 30, when they are in a centered disposition with respect to their respective lands 56, is slightly greater than the diameter of the cylindrical shank 52. Of course, when the shank 54 rotates, the lands 56 will move beneath the rods 30 and drive the rods 30 outwardly into tight engagement with the cylindrical wall 14 of the screw head 6.

Still another modified shank 58 (FIG. 7c) is of triangular configuration, having three side surfaces 60 which intersect at three 60° corners 62. Extended along each side surface 60 is a gripping rod 30, and when these gripping rods 30 are centered with respect to their respective side surfaces 60, a circle circumscribing and tangent to the outer areas of the three rods 30 will be located slightly outwardly from the three corners 62. The circle, however, will have a diameter slightly less than the diameter of the drive hole 12 in the screw head 6. This enables the shank and the gripping rods 30 to be inserted into the drive hole 12. When the shank 58 is turned, the gripping rods 30 move laterally on their side surfaces and in effect expand outwardly and grip the cylindrical wall 14 of the drive hole 12.

Yet another shank 64 (FIG. 7e) has the cross-sectional shape of a pentagon, and as such has five side surfaces 66 that intersect at corners 68. Along each of the five side surfaces 66 is a gripping rod 30, and the circle defined by the outwardly presented areas of the gripping rods 30 is only slightly smaller in diameter than the diameter of the drive hole 12 in the screw head 6.

Still another shank 70 (FIG. 7f) possesses a hexagonal cross-sectional configuration and as such has six side surfaces 72 that intersect at six 120° corners 74. A gripping rod 30 extends along each side surface 72 and is normally centered with respect to that surface. The outer areas of the gripping rods 30 define a circle that is only slightly smaller in diameter than the diameter of the drive hole 12 in the screw head 6.

In lieu of the gripping rods 30 that are of cylindrical configuration, gripping rods of other configuration may be used, as long as the configuration renders them suitable for gripping the cylindrical side wall 14 of the drive hole 12. For example, a gripping rod 76 (FIG. 8a) of elliptical cross section may be used, and the same holds true as to a gripping rod 78 (FIG 8b) that resembles the segment of the circle in cross section. In the latter instance, the several gripping rods 78 in combination should form a true circle when centered with respect to the side or camming surfaces 26 against which they are disposed, and that circle of course should be slightly smaller in diameter than the diameter of the drive hole 12. However, when the shank 20 rotates slightly with respect to the gripping rods 78, the gripping rods 78 move outwardly and define a circle of greater diameter. Indeed, they move outwardly until they engage the cylindrical wall 14 of the drive hole 12 and thus grip the wall 14. The rods 76 and 78 are not only suitable for use with the shank 20, but are likewise suitable for use with the other shanks 50, 54, 58, 64 and 70. In the case of the rods 78, the extent of the circle segment occupied by each rod 78 will be dependent on the particular shank with which it is used. For example, the triangular shank 58 will require rods 78 of larger circle segments than rods 78 used in connection with the hexagonal shank 70.

Not only is the driver B useful in installing and extracting the screws A, but it may also be used in lieu of a thread-type screw extractor. In this instance, a hole is drilled through a screw which cannot be extracted for one reason or another, and that hole is just large enough to receive the forward end of the driver B, that is, the forward end of the shank 20 and the gripping rods 30 positioned around the shank 20. Then the driver B is turned counterclockwise at its handle, and this of course causes the gripping rods 30 to move outwardly and grip the wall of the hole drilled into the screw. Consequently, the torque applied to the driver B is transferred to the screw so that the screw is extracted merely by turning the driver B.

This invention is intended to cover all changes and modifications of the example of the invention herein chosen for purposes of the disclosure which do not constitute departures from the spirit and scope of the invention.

I claim:

1. In combination with a screw having a substantially cylindrical drive hole extended axially within it and opening out of one of its ends, a driver for engaging the screw at the drive hole and turning the screw, the driver comprising an elongated shank that is fitted into the cylindrical drive hole and has at least one camming surface that faces the cylindrical wall of the hole, the camming surface being eccentric with respect to the axis of the cylindrical hole so that it is located at varying distances from that axis and from the cylindrical side wall, an elongated gripping element extended along the shank generally parallel to the shank and having a different cross-sectional configuration than the shank, the gripping element being within the cylindrical hole alongside the shank and further being normally centered along that portion of the camming surface that is farthest from the cylindrical wall of the hole and when in that position, the combined width of the shank and gripping element being such that the driver may be easily inserted into or withdrawn from the drive hole, the gripping element being capable of shifting laterally with respect to the camming surface sufficiently to become lodged between the cylindrical wall of the hole and the camming surface of the shank, whereby when the shank is turned while the gripping element remains generally in place along the cylindrical wall of the hole, the gripping element will become lodged between the cylindrical wall and the camming surface and the torque applied to the shank will be transferred to the screw.

2. The combination according to claim 1 wherein the gripping element is attached to the shank at its end located farthest from that end of the shank which is within the hole.

3. The combination according to claim 1 wherein the gripping element is attached to the shank at its rear end and the forward end is free to shift relative to the shank.

4. The combination according to claim 1 wherein the driver further includes a handle attached to the shank.

5. The combination according to claim 1 wherein the shank has a plurality of camming surfaces and gripping elements corresponding in number to the camming surfaces, there being a separate gripping element for each camming surface.

6. The combination according to claim 5 wherein the drive hole terminates at a beveled surface and the gripping elements extend deep enough into the drive hole to bear against the beveled surface at their forward ends so as to remain generally in place when the shank is initially turned.

7. The combination according to claim 5 wherein the shank is polygonal in cross section with each side of the polygonal shape serving as a camming surface, and the gripping elements are rods that extend along the sides of the polygonal shape, there being a single rod for each side, each rod being anchored at its one end and free to shift with respect to its side of the polygonal shape at its other end, each rod normally assuming a centered position with respect to the side along which it is located.

8. The combination according to claim 5 wherein the shank is polygonal in cross section with each side of the polygonal shape serving as a camming surface and the gripping elements are rods that extend along the sides of the polygonal shape.

9. A screw driver according to claim 8 wherein the shank has a forward end face; and wherein the gripping elements extend up to and terminate substantially at the forward face, the gripping elements further being attached to the shank remote from the forward face so that the gripping elements are free to shift relative to the shank adjacent to the forward face.

10. A screw driver according to claim 8 wherein the shank is polygonal in cross-section with the lands being the sides of the polygonal configuration.

11. A screw driver according to claim 8 wherein the gripping elements are cylindrical rods.

12. The combination according to claim 8 wherein the rods that form the gripping elements are circular in cross section and the diameter of each rod is less than the width of that side of the polygonal shape along which it lies.

13. A screw driver according to claim 12 and further comprising a handle attached to the shank.

14. A screw driver according to claim 8 wherein the camming surface is a land on the shank, with the side edges of the land being farther from the center of the shank than the midportion of the land.

15. A screw driver according to claim 14 wherein the shank has a forward end adapted to fit into the drive hole in the screw, and the elongated gripping elements extend along the forward end and are secured to the shank remote from the forward end.

16. A screw driver according to claim 3 wherein the gripping element is normally located along the midportion of the land, but is free to be displaced laterally over the land in either direction from the midportion.

17. A screw driver according to claim 4 wherein the gripping element is mounted on the shank such that when it is displaced laterally away from the midportion of the land it is biased back toward the midportion of the land.

18. A screw driver for driving a screw having a cylindrical hole that opens axially out of one of its ends, said screw driver comprising: a shank of noncircular cross section having a longitudinal axis and at least one camming surface, the camming surface being generally parallel to the axis, yet eccentric to the axis such that at least one side of the camming surface is further from the axis than other portions of the camming surface; and an elongated gripping element located along the camming surface of the shank, with the gripping element being smaller than the shank and further having a different configuration than the shank, the gripping element being mounted such that it normally assumes a position in which it is generally parallel to the axis of the shank and is centered over a portion of the camming surface that is away from said one side of the camming surface, the gripping element being free to shift laterally over the camming surface and toward said one side of the camming surface so as to increase the width of the driver sufficiently to enable it to lodge within and tightly bind against the walls of the cylindrical hole in the screw when the shank is turned, whereby torque that is applied to the driver is transferred to the screw.

19. A screw driver for turning a screw having a cylindrical drive hole that opens axially out of one of its ends, said screw driver comprising: a solid shank having a longitudinal axis and a plurality of camming surfaces along its sides, with the camming surfaces facing outwardly away from the axis and being located at equal angular intervals around the axis, each camming surface being eccentric with respect to the axis such as to have inner portions and outer portions, with the inner portions being located closer to the axis than the outer portions; and elongated gripping elements arranged in a single row around the shank such that they are normally located along and against the inner portions of the camming surfaces on the shank, with the gripping elements when so disposed being generally parallel to the axis of the shank, there being a single gripping element for each camming surface, the outwardly presented surfaces of the gripping elements forming the outwardly presented surface of the driver and defining a circle that is greater in diameter than the greatest width of the shank so that the gripping elements project radially beyond the shank, whereby the shank and gripping elements will fit into a drive hole of only slightly greater diameter than the circle and when so fitted, the gripping elements will be opposite to the cylindrical wall of the hole, each gripping element being mounted with respect to the shank such that it is free to shift laterally over its camming surface from the inner portion of its camming surface toward the outer portion, so as to increase the width of the driver sufficiently to enable the driver to lodge within and tightly bind against the walls of the cylindrical drive hole when the shank is turned, whereby torque that is applied to the driver is transferred to the screw.

20. A screw driver according to claim 19 wherein the shank has the shape of an equilateral polygon in cross-section, with each side of the polygonal shape serving as a camming surface.

21. A process for driving or extracting a screw having an axially directed drive hole that is substantially cylindrical and opens out of an end of the screw, said process comprising: inserting a driver into the drive hole, the driver having a shank provided with a camming surface located at varying distances from the axis of the drive hole and a gripping element located along and shiftable generally laterally with respect to the camming surface, the gripping element being further located opposite the side wall of the hole; and turning the shank of the driver while maintaining the gripping element generally in position with respect to the hole, all such that the camming surface will move under the gripping element to force the gripping element outwardly against the side wall of the drive hole, whereby the shank becomes lodged in the drive hole so that torque applied to it is transferred to the screw.

* * * * *